United States Patent [19]

Ohhara et al.

[11] Patent Number: 4,912,186
[45] Date of Patent: Mar. 27, 1990

[54] ACRYLIC RUBBER, ACRYLIC RUBBER COMPOSITION AND CURED RUBBER ARTICLE THEREOF

[75] Inventors: Toshio Ohhara; Yukihiro Sawada; Hiroshi Ise; Toshio Miyabayashi, all of Yokkaichi; Hiroji Enyo, Suzuka; Hozumi Sato, Yokkaichi, all of Japan

[73] Assignee: Japan Synthetic Rubber Co., Ltd., Tokyo, Japan

[21] Appl. No.: 236,218

[22] Filed: Aug. 25, 1988

Related U.S. Application Data

[63] Continuation-in-part of Ser. No. 173,578, Mar. 25, 1988, abandoned.

[30] Foreign Application Priority Data

Mar. 27, 1987 [JP] Japan .................................. 62-73612
Nov. 6, 1987 [JP] Japan ................................ 62-279393

[51] Int. Cl.$^4$ ............................................ C08F 22/26
[52] U.S. Cl. .................................... 526/323; 526/320; 526/327; 526/334
[58] Field of Search ................ 526/323, 320, 327, 334

[56] References Cited

U.S. PATENT DOCUMENTS 4,228,265 10/1986 Ohishi et al. ...................... 526/230
4,248,985 2/1981 Ohishi et al. .

FOREIGN PATENT DOCUMENTS 54-127494 10/1979 Japan .
60-084310 5/1985 Japan .
61-44909 4/1986 Japan .
61-057843 12/1986 Japan .
62-64809 3/1987 Japan .

Primary Examiner—Joseph L. Schofer
Assistant Examiner—N. Sarofim
Attorney, Agent, or Firm—Oblon, Spivak, McClelland, Maier & Neustadt

[57] ABSTRACT

An acrylic rubber obtainable by copolymerizing a monomer mixture of:
(A) 70 to 99.99% by weight of at least one compound selected from the group consisting of alkyl acrylates and alkoxyalkyl acrylates,
(B) 0.01 to 10% by weight of at least one compound represented by the general formula:

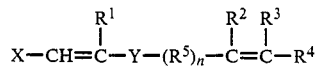

wherein $R^1$ is a hydrogen atom or a methyl group; X is a hydrogen atom, —COOR$^6$ (R$^6$ is an alkyl group having 1–10 carbon atoms or an alkoxyalkyl group having 2–14 carbon atoms), or

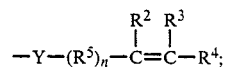

$R^2$, $R^3$ and $R^4$ are independently hydrogen atoms or groups having 1–10 carbon atoms whose carbon atom adjacent to C=C has no hydrogen; $R^5$ is a group having 1–10 carbon atoms whose carbon atom adjacent to C=C has no hydrogen; Y is

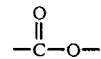

or —O—; and n is 1 or 0, and
(C) 0–20% by weight of at least one compound selected from the group consisting of other unsaturated compounds of the vinyl type, vinylidene type and vinylene type, in the presence of a radical polymerization initiator. Said acrylic rubber, when crosslinked with a crosslinking agent, gives a cured article having good heat resistance and a good compression set property and accordingly suitable for use as a hose or a sealing material.

24 Claims, 1 Drawing Sheet

ACRYLIC RUBBER, ACRYLIC RUBBER COMPOSITION AND CURED RUBBER ARTICLE THEREOF

CROSS-REFERENCE TO RELATED APPLICATION

This is an application of continuation-in-part of application Ser. No. 07/173,578 filed Mar. 25, 1988, now abandoned.

BACKGROUND OF THE INVENTION

1. Field of the Invention

This invention relates to an acrylic rubber which has good heat resistance and a good compression set property and can be quickly cured, a composition comprising said acrylic rubber and a cured rubber article thereof.

2. Description of Prior Art

Acrylic rubber is an elastomer comprising an acrylic acid ester as a main constituent. Since the acrylic acid ester polymer has no double bond in the main chain, an acrylic acid ester has conventionally been copolymerized with a crosslinking monomer which acts as a crosslinking site.

As the crosslinking monomer, there are known halogen group-containing compounds such as vinyl chloroacetate, chloroethyl vinyl ether, allyl chloroacetate and the like; and epoxy group-containing compounds such as glycidyl acrylate, glycidyl methacrylate, allyl glycidyl ether and the like.

However, an acrylic rubber comprising a halogen group-containing compound as a crosslinking monomer is disadvantageous in corroding a mold during curing, and an acrylic rubber comprising an epoxy group-containing compound as a crosslinking monomer is also disadvantageous in that the curing speed is low, and hence, it takes a long period of time after the curing for heat treatment (secondary curing) to obtain a cured article having optimum physical properties.

In order to solve these problems, there have been provided an acrylic rubber comprising as a crosslinking monomer, a diene compound such as ethylidenenorbornene, dicyclopentadiene, butadiene or the like [Japanese patent application Kokai (Laid-Open) No. 25656/75], and an acrylic rubber comprising, as a crosslinking monomer, a dihydrodicyclopentadienyl group-containing ester or alkenyl ester of an unsaturated carboxylic acid, such as dihydrodicyclopentadienyloxyethyl acrylate, 3-methyl-2-butenyl acrylate or the like [Japanese patent application Kokai (Laid-Open) No. 44909/86, Japanese Patent Publication No. 57843/86].

However, the acrylic rubbers comprising, as a crosslinking monomer, a diene compound, a dihydrodicyclopentadienyl group-containing ester of an unsaturated carboxylic acid or an alkenyl ester of an unsaturated carboxylic acid has insufficient heat resistance and compression set property, and an improvement in this respect has been desired for these rubbers.

SUMMARY OF THE INVENTION

The present inventors have made extensive research on the above problems, and consequently have found that the reason why the above-mentioned acrylic rubbers have poor heat resistance and a poor compression set property is that the acrylic rubbers have hydrogen in the allylic position of the unsaturated hydrocarbon group which takes part in the crosslinking reaction and also found that a polymer comprising, as a crosslinking monomer, a compound having no hydrogen in the allylic position of the unsaturated hydrocarbon group taking part in the crosslinking reaction gives good heat resistance and a good compression set property when the polymer is compounded with conventional compounding agents and then cured.

According to this invention, there is provided an acrylic rubber which has good heat resistance and a good compression set property and can quickly be cured, and is obtainable by copolymerizing a monomer mixture of:

(A) 70–99.99% by weight of at least one compound selected from the group consisting of alkyl acrylates and alkoxyalkyl acrylates, (B) 0.01–10% by weight of at least one compound represented by the general formula:

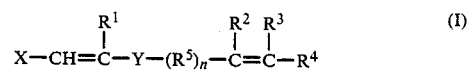

$$X-CH=\overset{R^1}{\underset{|}{C}}-Y-(R^5)_n-\overset{R^2}{\underset{|}{C}}=\overset{R^3}{\underset{|}{C}}-R^4 \quad (I)$$

wherein $R^1$ is a hydrogen atom or a methyl group; X is a hydrogen atom, $-COOR^6$ ($R^6$ is an alkyl group having 1–10 carbon atoms or an alkoxyalkyl group having 2–14 carbon atoms), or

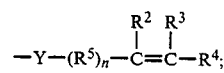

$$-Y-(R^5)_n-\overset{R^2}{\underset{|}{C}}=\overset{R^3}{\underset{|}{C}}-R^4;$$

$R^2$, $R^3$ and $R^4$ are independently hydrogen atoms or groups of 1–10 carbon atoms whose carbon atom adjacent to C=C has no hydrogen; $R^5$ is a group of 1–10 carbon atoms whose carbon atom adjacent to C=C has no hydrogen; Y is

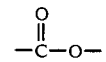

$$-\overset{\overset{\displaystyle O}{\|}}{C}-O-$$

or $-O-$; and n is 1 or 0, and (C) 0–20% by weight of at least one compound selected from the group consisting of other unsaturated compounds of the vinyl type, vinylidene type and vinylene type, in the presence of a radical polymerization initiator.

This invention further provides an acrylic rubber composition comprising the above acrylic rubber and a crosslinking agent, and also provides a cured rubber article thereof suitable for use as a hose and a sealing material.

DETAILED DESCRIPTION OF THE INVENTION

Figure 1:
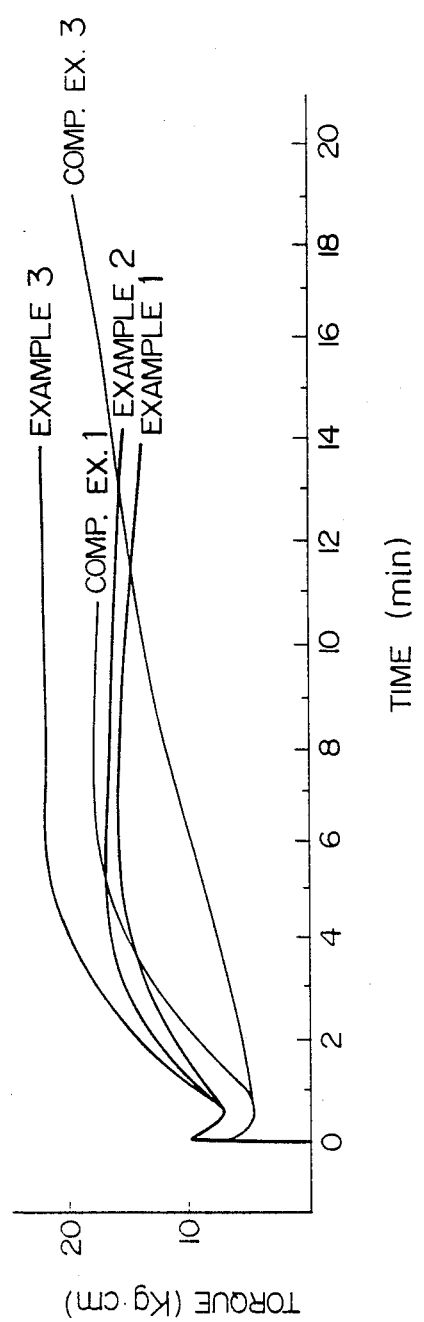

In the component (A) of the acrylic rubber of this invention, the alkyl acrylate includes, for example, methyl acrylate, ethyl acrylate, propyl acrylate, butyl acrylate, pentyl acrylate, 2-ethylhexyl acrylate, octyl acrylate, dodecyl acrylate, cyanoethyl acrylate, and the like; and the alkoxyalkyl acrylate includes, for example, methoxyethyl acrylate, ethoxyethyl acrylate, butoxyethyl acrylate, ethoxypropyl acrylate and the like. These compounds can be used alone or in admixture of two or more. The content of the component (A) is 70–99.99% by weight, preferably 80–99.98% by weight, more preferably 85–99.90% by weight. When the content of the component (A) is less than 70% by weight, the resulting acrylic rubber is hard, which is not desirable. When the content is more than 99.99% by weight, the acrylic rubber has a poor tensile strength.

The component (B) used in this invention is a compound represented by the general formula (I), in which no hydrogen is present in the allylic position of the unsaturated hydrocarbon group which takes part in the crosslinking reaction:

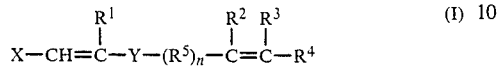

wherein $R^1$ is a hydrogen atom or a methyl group; X is a hydrogen atom, $-COOR^6$ ($R^6$ is an alkyl group having 1-10 carbon atoms or an alkoxyalkyl group having 2-14 carbon atoms), or

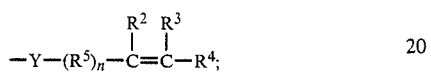

$R^1$, $R^3$ and $R^4$ are hydrogen atoms or groups having 1-10 carbon atoms whose carbon atom adjacent to C=C has no hydrogen, preferably hydrogen atoms or hydrocarbon groups having 3-10 carbon atoms; $R^5$ is a group having 1-10 carbon atoms whose carbon atom adjacent to C=C has no hydrogen, preferably a hydrocarbon group having 3-10 carbon atoms; Y is

or $-O-$; and n is 1 or 0. Preferably, the component (B) is a compound represented by the general formula (II) or (III):

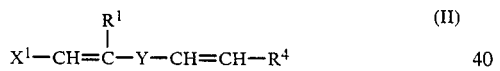

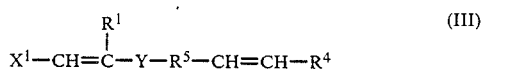

wherein $R^1$, Y, $R^4$ and $R^5$ have the same meanings as defined above, and $X^1$ is a hydrogen atom, $-COOR^6$ ($R^6$ has the same meaning as defined above), $-Y-CH=CH-R^4$ or $-Y-R^5-CH=CH-R^4$.

Specific examples of the component (B) include vinyl methacrylate, vinyl acrylate, 1,1-dimethylpropenyl methacrylate, 1,1-dimethylpropenyl acrylate, 3,3-dimethylbutenyl methacrylate, 3,3-dimethylbutenyl acrylate, divinyl itaconate, divinyl maleate, divinyl fumarate, vinyl 1,1-dimethylpropenyl ether, vinyl 3,3-dimethylbutenyl ether, 1-acryloyloxy-1-phenylethene, 1-acryloyloxy-2-phenylethene, 1-methacryloyloxy-1-phenylethene and 1-methacryloyloxy-2-phenylethene. Vinyl methacrylate and vinyl acrylate are particularly preferred. These compounds can be used alone or in admixture of two or more. The content of the component (B) is 0.01-10% by weight, preferably 0.02-5% by weight, more preferably 0.1-5% by weight. When the content is more than 10% by weight, the resulting acrylic rubber is inferior in elongation. When the content is less than 0.01% by weight, the acrylic rubber has an inferior tensile strength.

Specific examples of the component (C) are styrene; vinyltoluene; alpha-methylstyrene; vinylnaphthalene; halogenated styrenes; acrylonitrile; methacrylonitrile; acrylamide; N-methylolacrylamide; vinyl acetate; vinyl chloride; vinylidene chloride; divinylbenzene; acrylic acid esters of aromatic or alicylic alcohols such as cyclohexyl acrylate, benzyl acrylate, ethylene glycol dimethacrylate and the like; and esters of a lower saturated alcohol with an unsaturated carboxylic acid, for example, methacrylic acid, itaconic acid, fumaric acid, maleic acid or the like; etc. The component (C) is optionally used in an amount of not more than 20% by weight, preferably 0.01-20% by weight.

The radical polymerization initiator used in this invention may be any compound as long as it can generate a radical. Specific examples thereof are peroxides such as potassium persulfate, p-menthane hydroperoxide, methyl isobutyl ketone peroxide and the like, and azo compounds such as azobisisobutyronitrile and the like. The radical polymerization initiator is used in a proportion of 0.001-1.0% by weight based on the weight of the monomer mixture.

In this invention, the polymerization reaction can be conducted according to a conventional polymerization method such as suspension polymerization, emulsion polymerization or the like. The emulsifier used in the emulsion polymerization may be any substance capable of emulsifying and dispersing the above-mentioned monomer mixture, and preferred are an alkylsulfate, an alkylarylsulfate and a higher fatty acid salt. The reaction temperature is 0°-80° C. and the reaction time is about 0.01-30 hours.

The crosslinking agent is not critical and may be any crosslinking agent capable of crosslinking high-molecular weight compounds having a double bond in the molecule, and includes, for example, sulfur, sulfur-containing organic compounds, organic peroxides, resins, quinone derivatives, polyhalides, bis(dioxotriazoline) derivatives, aldehydes, epoxy compounds, amineborane complexes and dipolar compounds. Of these crosslinking agents, preferred are sulfur, sulfur-containing compounds and organic peroxides. Organic peroxides are particularly preferred.

The sulfur-containing organic compounds are compounds capable of releasing active sulfur by thermal dissociation and include, for example, tetramethylthiuram disulfide, which is a thiuram type accelerator; 4,4'-dithiomorpholine; and the like.

The organic peroxides include, for example, dicumyl peroxide, 1,1-di-tert-butylperoxy-3,3,5-trimethylcyclohexane, 1,3-bis(tert-butylperoxyisopropyl)-benzene and 2,5-dimethyl-2,5-di(tert-butylperoxy)hexane.

The resins include a polymethylol, a phenolic resin, etc.

The quinones include, for example, p-quinone; p-quinone derivatives such as tetrachlorobenzoquinone and the like; p-quinoneoxime; and p-quinoneoxime derivatives such as p-quinoneoxime benzoate and the like.

The polyhalides include trichloromelamine, hexachlorocyclopentadiene, octachlorocyclopentadiene, trichloromethane sulfochloride, benzotrichloride, etc.

The bis(dioxotriazoline) derivatives include 4-phenyl-1,2,4-triazoline-3,5-dione, bis-(p-3,5-dioxo-1,2,4-triazolin-4-ylphenyl)methane and the like.

The aldehydes include p-formaldehyde, polyoxymethylene and the like.

Examples of the epoxy compounds are chlorobisphenolic epoxy compounds.

Examples of the amine-borane complexes are combinations of a boron halide derivative with an amine, such as triethylamine-chloroborane, triethylenediaminebischloroborane and the like.

Examples of the dipolar compounds are dinitron, dinitrile oxide, dinitrile imine, disydnone, thionyl-p-phenylenediamine and the like.

These crosslinking agents can be used in combination with a crosslinking co-agent in order to achieve the shortening of crosslinking time, the reduction of crosslinking temperature and the improvement in properties of crosslinked rubber.

For example, when sulfur is used as a crosslinking agent, there can be effectively used as a crosslinking co-agent thiazoles such as mercaptobenzothiazole and the like; thiurams such as tetramethylthiuram disulfide and the like; guanidines such as diphenylguanidine and the like; and dithiocarbamic acid salts such as zinc dimethyldithiocarbamate and the like.

When an organic peroxide is used as a crosslinking agent, triallyl isocyanurate, ethylene glycol dimethacrylate, trimethylolpropane trimethacrylate, N,N'-methylenebisacrylamide, N,N'-m-phenylenedimaleimide, etc. can be effectively used as a crosslinking co-agent.

When a resin is used as a crosslinking agent, stannous chloride ($SnCl_2 \cdot 2H_2O$), ferric chloride ($FeCl_3 \cdot 6H_2O$), zinc chloride, etc. can be used as a crosslinking co-agent.

When a polyhalide is used as a crosslinking agent, halogen acceptors such as a metal oxide, triethanolamine and the like can be used as a crosslinking co-agent.

The crosslinking agent is used ordinarily in an amount of 0.1-20 parts by weight, preferably 1-10 parts by weight, per 100 parts by weight of the acrylic rubber of this invention.

The crosslinking co-agent is used in an amount of 0-20 parts by weight, preferably 1-10 parts by weight, per 100 parts by weight of the acrylic rubber.

The above acrylic rubber composition of this invention can further comprise, depending upon its application, a polymer which can be crosslinked by the above crosslinking agent. Such a polymer includes, for example, an ethylene-propylene rubber, an acrylonitrilebutadiene rubber, an epichlorohydrin rubber, an isoprene rubber, a natural rubber, a styrene-butadiene rubber, a butadiene rubber, a fluororubber, a chloroprene rubber and acrylic rubbers other than the present acrylic rubber.

The acrylic rubber composition of this invention may, if necessary, comprise compounding agents such as a filler, a reinforcing agent, an antioxidant, a stabilizer, a plasticizer, a processing aid and the like.

As the filler, carbon black and a white filler can be used preferably. As the carbon black, there may be used various carbon blacks having different physical and/or chemical properties. As the white filler, there may be used clay, talc, calcium carbonate, silica, magnesium carbonate and the like.

An antioxidant may be added to the acrylic rubber composition to further improve its heat resistance. As the antioxidant, there can be used various antioxidants such as phenol type, amine type and the like. Representative of the phenol type antioxidant is 2,2'-methylene-bis-(4-methyl-6-tert-butylphenol), and representative of the amine type antioxidant is 4,4'-(alpha,alpha-dimethylbenzyl) diphenylamine.

A processing aid may be added to the acrylic rubber composition in order to improve its processability by a Banbury mixer, rolls or the like. As the processing aid, there may be used higher fatty acids, salts of the acids and esters of the acids. Stearic acid is particularly preferred because it can improve the processability of the acrylic rubber composition without reducing its physical properties.

Various rubber articles can be produced by crosslinking the acrylic rubber composition of this invention.

When the acrylic rubber composition of this invention is used for the production of a hose, there can be produced a hose consisting of a single layer of the acrylic rubber composition, a composite hose having an inner layer and an outer layer either of which is composed of the present acrylic rubber composition and these hoses can be reinforced by a braid of textile or wire.

The acrylic rubber composition of this invention and the rubber article produced therefrom have the following characteristic features:
1. They are excellent in heat resistance.
2. They have good weather resistance.
3. They have good oil resistance.
4. They have a good compression set property.
5. The rubber composition can quickly be vulcanized and hence can omit secondary vulcanization (namely, it is excellent in processability).
6. The rubber composition can be crosslinked together with a wide variety of other rubbers.

The rubber article obtained by crosslinking the acrylic rubber composition of this invention highly satisfies the requirements to be possessed by hoses and sealing materials (including a gasket):

Particularly because of its good compression set property and excellent heat resistance, the rubber article can preferably be used as a hose and a sealing material which are excellent in tight binding and have a long life. In addition, the rubber article can be produced at a high productivity because the secondary curing can be omitted. Furthermore, the acrylic rubber of this invention can be formed into a laminate with other rubbers because the acrylic rubber can be crosslinked with a wide variety of other rubbers.

The acrylic rubber of this invention, the acrylic rubber composition comprising the acrylic rubber and the rubber article obtained by crosslinking the acrylic rubber composition have good oil resistance and good heat resistance and accordingly can be blended with other rubbers and resins to improve the oil resistances and heat resistances of these rubbers and resins. At that time, effective blending is possible also by using the acrylic rubber in a powder state.

The rubber article according to this invention can be used in such specific applications as hoses (e.g. oil cooler hose, air duct hose, power steering hose, control hose, intercooler hose, torque converter hose, oil return hose, heat-resistant hose), sealing materials (e.g. bearing seal, valve stem seal, various oil seals, O-rings, packings, gaskets), diaphragms, rubber plates, belts, oil level gage, cover materials (e.g. hose masking, heat insulator for pipe), rolls and the like. The rubber article is particularly useful as a hose or a sealing material such as gasket.

DESCRIPTION OF THE PREFERRED EMBODIMENTS

This invention is described in more detail below referring to Examples and the accompanying drawings.

The drawings show the curing curves obtained in Examples and Comparative Examples.

This invention should not be interpreted to be restricted to these Examples.

In Examples and Comparative Examples, part and % are by weight unless otherwise specified, and curing speed and properties of cured article were measured as follows:

Curing speed

Measured at 170° C. by means of a JSR Curelastometer Model III.

Properties of cured article

An uncured rubber sheet was prepared from an acrylic rubber composition and then cured at 170° C. for 20 minutes by a curing press. If necessary, the resulting sheet was further cured at 175° C. for 4 hours in an Geer oven. The properties of the cured article thus obtained wee measured in accordance with JIS K 6301.

Examples 1, 2, 6 and 7 and Comparative Examples 1, 2 and 4

100 parts of a monomer mixture shown in Table 1, 4 parts of sodium laurylsulfate and 0.2 part of potassium persulfate were fed to an iron vessel purged with nitrogen and were then subjected to polymerization at 50° C. for 15-20 hours. After the polymerization was substantially complete, the reaction mixture was transferred to a different vessel and steam was blown thereinto to remove the unreacted monomers. The acrylic rubber latex thus obtained was added to an aqueous solution containing 0.25% of calcium chloride to coagulate the latex (the amount of calcium chloride used was about 5% of the amount of the rubber formed). The coagulation product was washed with water and then dried at about 90° C. for 3-4 hours to obtain 7 different acrylic rubbers (hereinafter referred to as acrylic rubbers A, B, F, G, H, I and K, respectively).

100 parts of each of the above acrylic rubbers was mixed with 1.0 part of stearic acid, 1.5 parts of PERKADOX 14/40 (1,3-bis(t-butylperoxy-isopropyl)benzene, a product of Kayaku Noury Co., Ltd.), 1.5 parts of VULNOC PM (N,N'-m-phenylenedimaleimide, a product of Ohuchi Shinko Chemical Industry Co., Ltd.) and 50 parts of carbon black (DIA BLACK H, a product of Mitsubishi Chemical Industries, Ltd.) using rolls to obtain 7 different acrylic rubber compositions.

These rubber compositions were measured for curing speed and the results are shown in the accompanying drawings. The compositions were cured and the properties of the resulting cured articles were measured. The results are shown in Table 2.

Examples 3 to 5

Acrylic rubbers were obtained by repeating the same procedure as in Example 1, except that the respective monomer mixtures shown in Table 1 were used (hereinafter referred to as acrylic rubbers C, D and E, respectively).

Each of the acrylic rubbers was mixed with the same compounding agents as in Example 1, except that VULNOC PM was not used, in the same manner as in Example 1. The resulting acrylic rubber compositions were measured for curing speed and the results are shown in the accompanying drawings. The compositions were cured and the properties of the resulting cured articles were measured. The results are shown in Table 2.

Examples 8 and 9 and Comparative Example 5

Acrylic rubbers were obtained by repeating the same procedure as in Example 1, except that respective monomer mixtures shown in Table 1 were used (hereinafter referred to as acrylic rubbers L, M and P, respectively). Each of the acrylic rubbers was mixed with the same compounding agents as in Example 1, except that 0.2 part of NONSCORCH-N (N-nitrosodiphenylamine, a product of SEIKO CHEMICAL CO., LTD.) was further used in addition to the compounding agents used in Example 1, in the same manner as in Example 1. The resulting acrylic rubber compositions were measured for curing speed. The compositions were cured and the properties of the resulting cured articles were measured. The results obtained are shown in Table 2.

Example 10

Polymerization was conducted in the same manner as in Example 1, except that the same monomer mixture as used in Example 2 was used, the 0.2 part of potassium persulfate was replaced by 0.25 part of p-menthane hydroperoxide, 0.01 part of ferrous sulfate, 0.025 part of sodium ethylenediaminetetraacetate and 0.04 part of sodium formaldehydesulfoxylate and the polymerization conditions were changed to 30° C. and 0.5-10 hours, to obtain an acrylic rubber (hereinafter referred to as acrylic rubber N). The subsequent procedure was the same as in Example 1. The results obtained are shown in Table 2.

Example 11

The same procedure as in Example 10 was repeated, except that 0.25 part of KD 33-1 (methyl isobutyl ketone peroxide, a product of Kayaku Noury Co., Ltd.) was used in place of the 0.25 part of p-menthane hydroperoxide, to obtain an acrylic rubber (hereinafter referred to as acrylic rubber O). The results are shown in Table 2.

Comparative Example 3

An acrylic rubber was prepared by repeating the same procedure as in Example 1, except that the monomer mixture shown in Table 1 was used (hereinafter referred to as acrylic rubber J). This rubber was made into an acrylic rubber composition and then to its cured article in the same manner as in Example 1, except that the 1.5 parts of PERKADOX 14/40 and the 1.5 parts of VULNOC PM used in Example 1 were replaced by 1.5 parts of VULNOC AB (ammonium benzoate, a product of Ohuchi Shinko Chemical Industry Co., Ltd.). The properties of the cured article are shown in Table 2.

As is clear from Table 2 and the accompanying drawings, the acrylic rubber compositions according to this invention can be cured more quickly than the conventional acrylic rubbers and the cured articles obtained from these compositions have good heat resistance and a good compression set property.

TABLE 1

| | Examples | | | | | | |
|---|---|---|---|---|---|---|---|
| | 1 | 2 | 3 | 4 | 5 | 6 | 7 |
| Composition of monomer mixture (%) | | | | | | | |
| Ethyl acrylate | 99.7 | 99.7 | 99.4 | 94.4 | 98.8 | 22.7 | 99.5 |

TABLE 1-continued

| | | | | | | | |
|---|---|---|---|---|---|---|---|
| Butyl acrylate | — | — | — | — | — | 30 | — |
| 2-Methyoxyethyl acrylate | — | — | — | — | — | 40 | — |
| Acrylonitrile | — | — | — | — | — | 7 | — |
| Vinyl acrylate | — | 0.3 | 0.6 | — | 1.2 | 0.3 | — |
| Vinyl methacrylate | 0.3 | — | — | 5.6 | — | — | — |
| Dihydrodicyclopentadienyloxyethyl acrylate | — | — | — | — | — | — | — |
| Allyl glycidyl ether | — | — | — | — | — | — | — |
| 3,3-Dimethylbutenyl acrylate | — | — | — | — | — | — | 0.5 |
| Allyl acrylate | — | — | — | — | — | — | — |
| Acrylic rubber | A | B | C | D | E | F | G |

| | Comparative Examples | | | | Examples | | | | Comparative Example |
|---|---|---|---|---|---|---|---|---|---|
| | 1 | 2 | 3 | 4 | 8 | 9 | 10 | 11 | 5 |
| | 97 | 88 | 97 | 99.0 | — | — | 99.7 | 99.7 | — |
| | — | — | — | — | 49.9 | 49.95 | — | — | 50 |
| | — | — | — | — | 50 | 50 | — | — | 47 |
| | — | — | — | — | — | — | — | — | — |
| | — | 12 | — | — | 0.1 | 0.05 | 0.3 | 0.3 | — |
| | — | — | — | — | — | — | — | — | — |
| | 3 | — | — | — | — | — | — | — | 3 |
| | — | — | 3 | — | — | — | — | — | — |
| | — | — | — | — | — | — | — | — | — |
| | — | — | — | 1.0 | — | — | — | — | — |
| | H | I | J | K | L | M | N | O | P |

TABLE 2

| | Examples | | | | | | |
|---|---|---|---|---|---|---|---|
| | 1 | 2 | 3 | 4 | 5 | 6 | 7 |
| Properties of cured article (curing: at 170° C. for 20 minutes) | | | | | | | |
| 100% modulus (Kgf/cm$^2$) | 32 | 33 | 70 | — | 73 | 47 | 48 |
| Tensile strength (Kgf/cm$^2$) | 105 | 128 | 120 | 110 | 110 | 114 | 110 |
| Elongation (%) | 300 | 310 | 150 | 75 | 170 | 180 | 230 |
| Hardness (JIS A) | 71 | 70 | 71 | 75 | 73 | 67 | 70 |
| Properties of cured article (curing: at 170° C. for 20 minutes and then at 175° C. for 4 hours) | | | | | | | |
| 100% modulus (kgf/cm$^2$) | 36 | 33 | 65 | — | 70 | 51 | 48 |
| Tensile strength (kgf/cm$^2$) | 110 | 128 | 118 | 113 | 115 | 117 | 116 |
| Elongation (%) | 315 | 310 | 160 | 80 | 180 | 180 | 235 |
| Hardness (JIS A) | 75 | 72 | 73 | 77 | 76 | 67 | 72 |
| Heat resistance (aged by air heating at 175° C. for 70 hours) | | | | | | | |
| Cured article (curing: at 170° C. for 20 minutes) | | | | | | | |
| Change of tensile strength (%) | −6 | −5 | +1 | +4 | +3 | +2 | −5 |
| Change of elongation (%) | −4 | −2 | ±0 | +2 | +1 | +6 | −3 |
| Change of hardness (JIS A) | +4 | +2 | +3 | +3 | +2 | +6 | +3 |
| Cured article (curing: at 170° C. for 20 minutes and then 175° C. for 4 hours) | | | | | | | |
| Change of tensile strength (%) | −3 | −1 | −1 | −3 | −2 | −7 | −2 |
| Change of elongation (%) | −4 | −3 | +2 | +5 | +3 | −7 | −3 |
| Change of hardness (JIS A) | +1 | +1 | +2 | +2 | +1 | +5 | +1 |
| Compression set (150° C. for 70 hours, 25% compression) | | | | | | | |
| Cured article (curing: at 170° C. for 20 minutes) | | | | | | | |
| Cs (%) | 32 | 26 | 25 | 24 | 24 | 23 | 29 |
| Cured article (curing: at 170° C. for 20 minutes and then at 175° C. for 4 hours) | | | | | | | |
| Cs (%) | 20 | 13 | 13 | 10 | 14 | 14 | 16 |

| Comparative Examples | | | | Examples | | | | Comparative Example |
|---|---|---|---|---|---|---|---|---|
| 1 | 2 | 3 | 4 | 8 | 9 | 10 | 11 | 5 |
| 59 | Formation of vulcanized sheet was impossible. | 30 | 41 | 43 | 30 | 26 | 40 | 40 |
| 150 | | 163 | 100 | 106 | 96 | 122 | 115 | 48 |
| 200 | | 415 | 265 | 200 | 250 | 300 | 270 | 150 |
| 73 | | 70 | 70 | 55 | 54 | 65 | 72 | 56 |
| 72 | | 53 | 47 | 47 | 37 | 29 | 44 | 45 |
| 166 | | 180 | 115 | 110 | 99 | 125 | 121 | 55 |
| 195 | | 250 | 250 | 210 | 240 | 300 | 280 | 140 |
| 75 | | 75 | 71 | 57 | 56 | 68 | 74 | 60 |

TABLE 2-continued

| | | | | | | | | |
|---|---|---|---|---|---|---|---|---|
| −8 | | +4 | −8 | −6 | −8 | −8 | +5 | −12 |
| −34 | | −35 | −40 | −7 | −9 | +8 | +5 | −13 |
| +10 | | +10 | +12 | +7 | +8 | +5 | +4 | +14 |
| −17 | | −8 | −20 | −5 | −8 | −8 | ±0 | −8 |
| −35 | | −10 | −37 | −7 | −8 | +5 | +3 | −10 |
| +10 | | +7 | +13 | +4 | +6 | +3 | +2 | +11 |
| Measurement was impossible. | | | | | | | | |
| 44 | | 64 | 48 | 25 | 33 | 25 | 25 | 55 |
| 25 | | 30 | 29 | 12 | 17 | 11 | 13 | 37 |

Examples 12–16 and Comparative Examples 6–7

Acrylic rubbers were obtained by repeating the same procedure as in Example 1, except that the respective monomer mixtures shown in Table 3 were used (hereinafter referred to as acrylic rubbers Q, R, S and T, respectively). Each of these acrylic rubbers was mixed with 1.0 part of stearic acid, 50 parts of carbon black (DIA BLACK H, a product of Mitsubishi Chemical Industries, Ltd.), the crosslinking agent shown in Table 4 and the crosslinking co-agent shown in Table 4, on rolls to obtain respective acrylic compositions.

These compositions were extruded into tubes of 9.5 mm in outside diameter and 1.0 mm in thickness by an extruder, and each tube was cured under the conditions shown in Table 5. From the resulting cured articles, respective test samples were cut out and measured for properties. The results obtained are shown in Table 5.

As is clear from Table 5, the acrylic rubber compositions according to this invention have good heat resistance and a good compression set property and can be crosslinked quickly.

Examples 17–20 and Comparative Examples 8–11

The acrylic rubber B or T was mixed with the rubber and compounding agents shown in Table 6 in the proportions shown in Table 6 on rolls to obtain 8 different acrylic rubber compositions. These compositions were cured under the conditions shown in the ultimate section of Table 6. The resulting cured articles were measured for properties, to obtain the results shown in Table 7.

As is clear from Table 7, cured articles of blends between (a) an acrylic rubber composition of this invention and (b) a polymer which can be crosslinked with a crosslinking agent used for crosslinking of the acrylic rubber of this invention are superior to conventional acrylic rubbers in heat resistance and compression set.

TABLE 3

| Acrylic rubber | Q | R | S | T |
|---|---|---|---|---|
| Composition of acrylic rubber | | | | |
| Ethyl acrylate | 96 | 98.8 | 40.8 | 97 |
| Butyl acrylate | — | — | 30 | — |
| Methoxyethyl acrylate | — | — | 25 | — |
| Acrylonitrile | — | — | 4 | — |
| Vinyl acrylate | — | — | 0.2 | — |
| Vinyl methacrylate | 4 | — | — | — |
| 1,1-Dimethyl-2-propenyl acrylate | — | 1.2 | — | — |
| Ethylideneorbornene | — | — | — | 3 |

TABLE 4

| | Examples | | | | | | | Comparative Examples | | | | |
|---|---|---|---|---|---|---|---|---|---|---|---|---|
| | 2 | 12 | 13 | 1 | 14 | 15 | 16 | 1 | 3 | 6 | 7 | 2 |
| Acrylic rubber | B | B | B | A | Q | R | S | H | J | T | T | I |
| Crosslinking agent | | | | | | | | | | | | |
| PERKADOX 14/40*[1] | 1.5 | 1.5 | — | 1.5 | — | 1.5 | 1.5 | 1.5 | — | 1.5 | — | 1.5 |
| KAYAHEXA AD-40*[2] | — | — | 3 | — | — | — | — | — | — | — | — | — |
| Sulfur | — | — | — | — | 0.4 | — | — | — | — | — | 0.4 | — |
| VULNOC AB*[3] | — | — | — | — | — | — | — | — | 1.5 | — | — | — |
| Crosslinking co-agent | | | | | | | | | | | | |
| VULNOC PM*[4] | 1.5 | — | — | 1.5 | — | 1.5 | 1.5 | 1.5 | — | 1.5 | — | 1.5 |
| HICROSS M*[5] | — | 5 | — | — | — | — | — | — | — | — | — | — |
| TAIC ® *[6] | — | — | 3 | — | — | — | — | — | — | — | — | — |
| Tetramethylthiuram disulfide | — | — | — | — | 0.75 | — | — | — | — | — | 0.75 | — |

Note:
*[1] 1,3-Bis(t-butylperoxyisopropyl)benzene, a product of Kayaku Noury Co., Ltd.
*[2] 2,5-Dimethyl-2,5-di(t-butylperoxy)hexane, a product of Kayaku Noury Co., Ltd.
*[3] Ammonium benzoate, a product of Ohuchi Shinko Chemical Industry Co., Ltd.
*[4] N,N'—m-phenylenedimaleimide, a product of Ohuchi Shinko Chemical Industry Co., Ltd.
*[5] Trimethylolpropane trimethacrylate, a product of SEIKO CHEMICAL CO., LTD.
*[6] Triallyl isocyanurate, a product of NIPPON KASEI CHEMICAL CO., LTD.

TABLE 5

| | Examples | | | | | | |
|---|---|---|---|---|---|---|---|
| | 2 | 12 | 13 | 1 | 14 | 15 | 16 |
| Properties of cured article (curing: at 170° C. for 20 minutes) | | | | | | | |
| 100% modulus (kgf/cm$^2$) | 33 | 30 | 24 | 32 | 50 | 73 | 51 |
| Tensile strength (kgf/cm$^2$) | 128 | 120 | 115 | 105 | 102 | 110 | 114 |
| Elongation (%) | 310 | 355 | 365 | 300 | 260 | 170 | 180 |
| Hardness (JIS A) | 70 | 72 | 71 | 71 | 70 | 73 | 64 |
| Properties of cured article | | | | | | | |

TABLE 5-continued (curing: at 170° C. for 20 minutes) and then at 175° C. for 4 hours)

| | | | | | | | |
|---|---|---|---|---|---|---|---|
| 100% modulus (kgf/cm$^2$) | 33 | 34 | 30 | 36 | 61 | 70 | 45 |
| Tensile strength (kgf/cm$^2$) | 128 | 123 | 123 | 110 | 108 | 115 | 111 |
| Elongation (%) | 310 | 330 | 340 | 315 | 245 | 180 | 180 |
| Hardness (JIS A) | 72 | 74 | 74 | 75 | 72 | 76 | 66 |

Heat resistance (aged by air heating at 175° C. for 70 hours)
Cured article (curing: at 170° C. for 20 minutes)

| | | | | | | | |
|---|---|---|---|---|---|---|---|
| Change of tensile strength (%) | −5 | −10 | −2 | −6 | −8 | +3 | 0 |
| Change of elongation (%) | −2 | −8 | −15 | −4 | −12 | +1 | +1 |
| Change of hardness (JIS A) | +2 | +5 | +8 | +4 | +8 | +2 | +8 |

Cured article (curing: at 170° C. for 20 minutes and then at 175° C. for 4 hours)

| | | | | | | | |
|---|---|---|---|---|---|---|---|
| Change of tensile strength (%) | −1 | −15 | −5 | −3 | −10 | −2 | −2 |
| Change of elongation (%) | −3 | −5 | −10 | −4 | −17 | +3 | −7 |
| Change of hardness (JIS A) | +1 | +3 | +6 | +1 | +6 | +1 | +7 |

Compression set (150° C. for 70 hours, 25% compression)
Cured article (curing: at 170° C. for 20 minutes)

| | | | | | | | |
|---|---|---|---|---|---|---|---|
| Cs (%) | 26 | 25 | 34 | 32 | 52 | 24 | 20 |

Cured article (curing: at 170° C. for 20 minutes and then at 175° C. for 4 hours)

| | | | | | | | |
|---|---|---|---|---|---|---|---|
| Cs (%) | 13 | 12 | 19 | 20 | 26 | 14 | 11 |

| | Comparative Examples | | | | |
|---|---|---|---|---|---|
| | 1 | 3 | 6 | 7 | 2 |
| | 59 | 30 | 22 | 13 | Formation |
| | 150 | 163 | 105 | 118 | of vulcanized |
| | 200 | 415 | 360 | 715 | sheet was |
| | 73 | 70 | 68 | 67 | impossible. |
| | 72 | 53 | 35 | 21 | |
| | 166 | 180 | 115 | 144 | |
| | 195 | 250 | 300 | 495 | |
| | 75 | 75 | 70 | 72 | |
| | −8 | +4 | −8 | −15 | |
| | −34 | −35 | −13 | −51 | |
| | +10 | +10 | +2 | +15 | |
| | −17 | −8 | −10 | −29 | |
| | −35 | −10 | −30 | −29 | |
| | +10 | +7 | +11 | +11 | |
| | 44 | 64 | 38 | 81 | |
| | 25 | 30 | 26 | 54 | |

TABLE 6

| | Examples | | | | Comparative Examples | | | |
|---|---|---|---|---|---|---|---|---|
| | 17 | 18 | 19 | 20 | 8 | 9 | 10 | 11 |
| Compounding recipe (parts) | | | | | | | | |
| Acrylic rubber type | B | B | B | B | T | T | T | T |
| amount | 50 | 50 | 50 | 50 | 50 | 50 | 50 | 50 |
| Acrylonitrile-butadiene rubber 1*[1] | 50 | — | — | — | 50 | — | — | — |
| Acrylonitrile-butadiene rubber 2*[2] | — | 50 | — | — | — | 50 | — | — |
| Ethylene-propylene rubber*[3] | — | — | 50 | — | — | — | 50 | — |
| Fluororubber*[4] | — | — | — | 50 | — | — | — | 50 |
| Carbon black (HAF) | 50 | 40 | 40 | 25 | 50 | 40 | 40 | 25 |
| Carbon black (MT) | — | — | — | 15 | — | — | — | 15 |
| Stearic acid | 1 | 1 | 1 | 0.5 | 1 | 1 | 1 | 0.5 |
| Sodium stearate | — | — | — | 1 | — | — | — | 1 |
| Zinc oxide | — | 5 | 5 | — | — | 5 | 5 | — |
| PERKADOX 14/40*[5] | 1 | — | — | 2 | 1 | — | — | 2 |
| KAYACUMYL D40C*[6] | — | 4 | 6.75 | — | — | 4 | 6.75 | — |
| VULNOC PM*[7] | 2 | — | — | — | 2 | — | — | — |
| TAIC ® *[8] | — | — | 3 | 2.5 | — | — | 3 | 2.5 |
| Conditions of curing | | | | | | | | |
| Primary curing (press) | 170° C. × 20 min | 155° C. × 30 min | 160° C. × 40 min | 170° C. × 20 min | 170° C. × 20 min | 155° C. × 30 min | 160° C. × 40 min | 170° C. × 20 min |
| Secondary curing (oven) | — | — | — | 160° C. × 15 | — | — | — | 160° C. × 15 |

TABLE 6-continued

| | Examples | | | | Comparative Examples | | | |
|---|---|---|---|---|---|---|---|---|
| | 17 | 18 | 19 | 20 | 8 | 9 | 10 | 11 |
| | | | | hr. | | | | hr. |

Note:
*¹N640H, a product of Japan Synthetic Rubber Co., Ltd.
*²N231H, a product of Japan Synthetic Rubber Co., Ltd.
*³EP11 a product of Japan Synthetic Rubber Co., Ltd.
*⁴AFLAS 150P, a product of Japan Synthetic Rubber Co., Ltd.
*⁵See *¹ of Table 4.
*⁶Dicumyl peroxide, a product of Kayaku Noury Co., Ltd.
*⁷See *4 of Table 4.
*⁸See *6 of Table 4.

TABLE 7

| | Examples | | | | Comparative Examples | | | |
|---|---|---|---|---|---|---|---|---|
| | 17 | 18 | 19 | 20 | 8 | 9 | 10 | 11 |
| 100% modulus (kgf/cm²) | 47 | 42 | 25 | 34 | 42 | 38 | 21 | 32 |
| Tensile strength (kgf/cm²) | 161 | 165 | 142 | 84 | 149 | 155 | 131 | 66 |
| Elongation (%) | 260 | 330 | 405 | 400 | 280 | 360 | 420 | 530 |
| Hardness (JIS A) | 70 | 70 | 66 | 78 | 68 | 69 | 65 | 78 |
| Heat resistance*¹ (aged by air-heating) | | | | | | | | |
| Change of tensile strength (%) | −10 | −20 | −35 | −2 | −17 | −32 | −71 | −6 |
| Change of elongation (%) | −15 | −24 | −21 | −4 | −32 | −46 | −40 | −15 |
| Change of hardness (JIS A) | +7 | +6 | −5 | +2 | +13 | +9 | −6 | +7 |
| Compression set (150° C. × 70 hours, 25% compression) | | | | | | | | |
| Cs (%) | 26 | 24 | 25 | 26 | 34 | 37 | 36 | 37 |

Note:
*¹Aging was effected at 150° C. for 70 hours in Examples 17 to 19 and comparative Examples 8 to 10 and at 175° C. for 70 hours in Example 20 and Comparative Example 11.

What is claimed is:

1. An acrylic rubber obtained by copolymerizing a monomer mixture of:
   (A) 70 to 99.99% by weight of at least one compound selected from the group consisting of alkyl acrylates and alkoxyalkyl acrylates,
   (B) 0.01 to 10% by weight of at least one compound represented by the general formula:

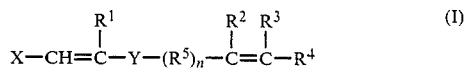

wherein $R^1$ is a hydrogen atom or a methyl group; X is a hydrogen atom, $-COOR^6$ ($R^6$ is an alkyl group having 1–10 carbon atoms or an alkoxyalkyl group having 2–14 carbon atoms), or

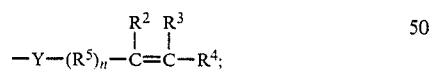

$R^2$, $R^3$ and $R^4$ are independently hydrogen atoms or groups having 1–10 carbon atoms whose carbon atom adjacent to C=C has no hydrogen; $R^5$ is a group having 1–10 carbon atoms whose carbon atom adjacent to C=C has no hydrogen; Y is

or $-O-$; and n is 1 or 0, and
   (C) 0–20% by weight of at least one other compound selected from the group consisting of vinyl compound, vinylidene compound and vinylene compound,
   in the presence of a radical polymerization initiator.

2. The acrylic rubber according to claim 1, wherein the component (A) is selected from the group consisting of methyl acrylate, ethyl acrylate, propyl acrylate, butyl acrylate, pentyl acrylate, 2-ethylhexyl acrylate, octyl acrylate, dodecyl acrylate, cyanoethyl acrylate, methoxyethyl acrylate, ethoxyethyl acrylate, butoxyethyl acrylate and ethoxypropyl acrylate.

3. The acrylic rubber according to claim 1, wherein the component (A) is used in a proportion of 80–99.90% by weight.

4. The acrylic rubber according to claim 1, wherein the component (B) is at least one compound represented by the general formula:

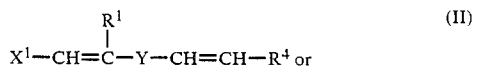

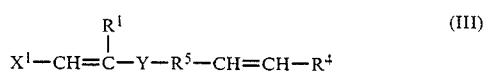

wherein $R^1$, $R^4$, $R^5$ and Y have the same meanings as defined in claim 1, and $X^1$ is a hydrogen atom, $-COOR^6$ ($R^6$ has the same meaning as defined in claim 1), $-Y-CH=CH-R^4$ or $-Y-R^5-CH=CH-R^4$.

5. The acrylic rubber according to claim 1, wherein the component (B) is at least one compound selected from the group consisting of vinyl methacrylate, vinyl acrylate, 1,1-dimethylpropenyl methacrylate, 1,1-dimethylpropenyl acrylate, 3,3-dimethylbutenyl methacrylate, 3,3-dimethylbutenyl acrylate, divinyl itaconate, divinyl maleate, divinyl fumarate, vinyl 1,1-dimethylpropenyl ether, vinyl 3,3-dimethylbutenyl ether, 1-acryloyloxy-1-phenylethene, 1-acryloyloxy-2-phenylethene, 1-methacryloyloxy-1-phenylethene and 1-methacryloyloxy-2-phenylethene.

6. The acrylic rubber according to claim 1, wherein the component (B) is vinyl methacrylate or vinyl acrylate.

7. The acrylic rubber according to claim 1, wherein the component (B) is used in a proportion 0.1-5% by weight.

8. The acrylic rubber according to claim 1, wherein the component (C) is at least one compound selected from the group consisting of styrene, vinyltoluene, alphamethylstyrene, vinylnaphthalene, halogenated styrenes, acrylonitrile, methacrylonitrile, acrylamide, N-methylolacrylamide, vinyl acetate, vinyl chloride, vinylidene chloride, divinylbenzene, cyclohexyl acrylate, benzyl acrylate, ethylene glycol dimethacrylate, methacrylic acid, itaconic acid, fumaric acid and maleic acid and is used in a proportion of 0.01-20% by weight.

9. The acrylic rubber according to claim 1, wherein the radical polymerization initiator is a peroxide or an azo compound.

10. The acrylic rubber according to claim 9, wherein the radical polymerization initiator is used in a proportion of 0.001-1.0% by weight based on the weight of the monomer mixture.

11. The acrylic rubber according to claim 10, wherein the polymerization is conducted at 0°-80° C. for 0.01-30 hours.

12. An acrylic rubber composition essentially comprising the acrylic rubber of claim 1 and a crosslinking agent.

13. The acrylic rubber composition according to claim 12, wherein the crosslinking agent is sulfur, a sulfur-containing organic compound, an organic peroxide, a resin, a quinone derivative, a polyhalide, a bis(dioxotriazoline) derivative, an aldehyde, an epoxy compound, an amine-borane complex or a dipolar compound.

14. The acrylic rubber composition according to claim 12, wherein the crosslinking agent is sulfur, a sulfur-containing organic compound or an organic peroxide.

15. The acrylic rubber composition according to claim 12, wherein the crosslinking agent is an organic peroxide.

16. The acrylic rubber composition according to claim 12, wherein the crosslinking agent is used in a proportion of 0.1-20 parts by weight per 100 parts by weight of the acrylic rubber.

17. The acrylic rubber composition according to claim 12, which further comprises a crosslinking co-agent.

18. The acrylic rubber composition according to claim 17, wherein the crosslinking co-agent is contained in a proportion of 1-10 parts by weight per 100 parts by weight of the acrylic rubber.

19. The acrylic rubber composition according to claim 13, which further comprises conventional compounding agents other than the crosslinking agent.

20. The acrylic rubber composition according to claim 13, which further comprises a polymer which can be crosslinked with the same crosslinking agent.

21. The acrylic rubber composition according to claim 20, wherein the polymer is at least one member selected from the group consisting of an ethylene-propylene rubber, an acrylonitrile-butadiene rubber, an epichlorohydrin rubber, an isoprene rubber, natural rubber, a styrene-butadiene rubber, a butadiene rubber, a fluororubber, a chloroprene rubber and other acrylic rubbers.

22. A cured article of the acrylic rubber composition of claim 13.

23. The cured article according to claim 22, which is in the form of a hose.

24. The cured article according to claim 22, which is in the form of a sealing material.

* * * * *